United States Patent [19]

Vroeginday

[11] 4,035,299

[45] July 12, 1977

[54] METHOD OF INITIATING A FLUID FLOW WITHIN A SIPHON TUBE BETWEEN AN AQUARIUM AND ITS ASSOCIATED FILTER TANK

[76] Inventor: Crine Vroeginday, 187 Livingston St., Clifton, N.J. 07013

[21] Appl. No.: 577,308

[22] Filed: May 13, 1975

[51] Int. Cl.² .......................................... E04H 3/20
[52] U.S. Cl. .............................. 210/169; 137/128; 137/142
[58] Field of Search ............... 137/128, 140, 142; 119/5; 210/169, 416

[56] References Cited

U.S. PATENT DOCUMENTS

| 117,750 | 8/1971 | Lagillardles | 137/142 |
|---|---|---|---|
| 264,197 | 9/1982 | Saunders | 137/142 |
| 2,184,025 | 12/1939 | Smith et al. | 137/128 |
| 2,737,490 | 3/1965 | Lambertson | 210/169 |
| 2,828,019 | 3/1958 | Lambertson | 210/169 |
| 3,261,471 | 7/1966 | Halpert | 210/169 |
| 3,734,853 | 5/1973 | Horrath | 210/169 |

*Primary Examiner*—Theodore A. Granger
*Attorney, Agent, or Firm*—Silverman and Jackson

[57] ABSTRACT

The present invention comprises apparatus for initiating a fluid flow within a siphon tube from an aquarium to its associated filter tank. The novel apparatus comprises the addition of a vacuum duct with an upturned fluid trap to an otherwise conventional siphon tube; the detachable attachment of a siphon bulb to the trap outlet of the vacuum duct while both the aquarium and filter tank are full, with the filter tank pump being in an 37 off" condition; the squeezing of the siphon bulb in order to exhaust air from said bulb and ultimately out through the aquarium tank. The bulb is then released, thereby creating a pressure differential within the siphon tube which will cause the air within said tube to be drawn into the bulb. The removal of the trapped air within the siphon tube, and from the vacuum duct and its trap, will cause fluid to fill the siphon tube, and vacuum duct. A fluid flow will be initiated from the aquarium to the filter tank as the pump starts to pump fluid out of the filter tank into the aquarium. The air is locked out of both the siphon tube and duct by the fluid in the upturned trap. The siphon bulb is then removed until the next occasion on which it is necessary to interrupt the fluid flow for cleaning.

2 Claims, 6 Drawing Figures

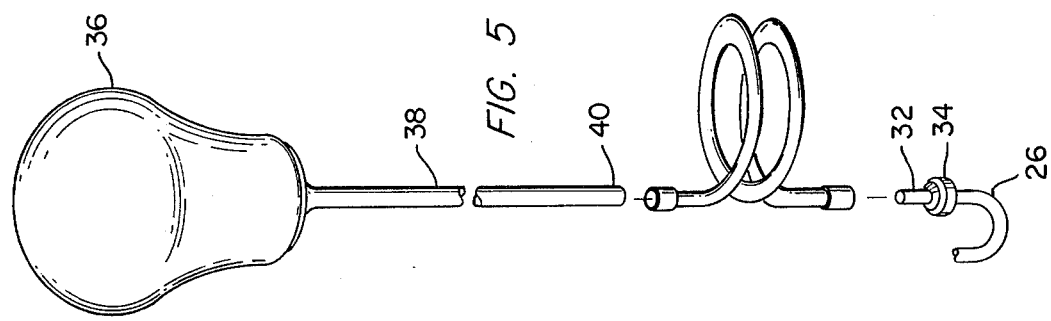
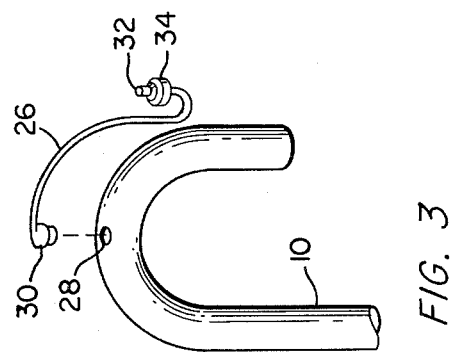
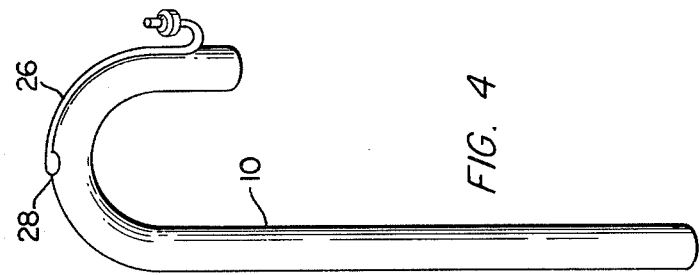
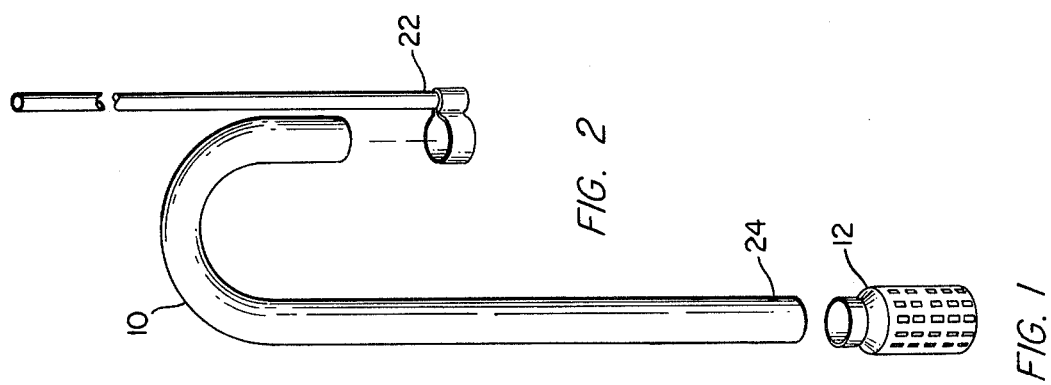

METHOD OF INITIATING A FLUID FLOW WITHIN A SIPHON TUBE BETWEEN AN AQUARIUM AND ITS ASSOCIATED FILTER TANK

BACKGROUND OF THE INVENTION

The present invention relates to the use of a vacuum bulb in combination with a valveless vacuum duct added to a siphon tube as a means for initiating a fluid flow from a primary aquarium to its auxiliary filter tank.

The prior art has seen the use of vacuum bulbs as permanently affixed elements of relatively complicated aquarium and other types of fish tank systems.

For example, see U.S. Pat. No. 3,549,015 to Willinger; U.S. Pat. No. 3,584,602 to Stossio; and U.S. Pat. No. 3,734,853 to Horvath.

Each of the above patents disclose use of siphon bulb as a fixed and permanently incorporated element of a larger fish tank system. Because of the permanent nature of the siphon bulb in said references, it is noted that it has been necessary to provide such bulbs with a variety of different valves and filter arrangements in order to make them fully functional within the contexts of their prior art use. That is, prior art usages of siphon bulbs have occurred in association with moving parts, such as valves and tubes which have been required because of the fixed, non-detachable nature of such bulbs, valves that can get dirty and malfunction and interfere with the cleaning of said valves and tubes.

SUMMARY OF THE INVENTION

A method for initiating a liquid flow within a siphon tube passing from an aquarium to its associated filter tank, comprising the steps of:

a. affixing a vacuum duct having an upturned fluid trap to an otherwise conventional siphon tube;

b. detachably affixing a siphon bulb to the outlet of said upturned fluid trap while both the aquarium and the filter tank are full, with the filter tank pump being in an "off" condition;

c. squeezing said siphon bulb, thereby exhausting air from said bulb, into the aquarium tank, and ultimately into the atmosphere; and d. releasing said siphon bulb, thereby causing the air within said siphon tube to be sucked into said bulb, creating a partial vacuum within said tube, and thereby causing liquid from the aquarium to fill said tube, wherein said liquid will form a continuous fluid flow whenever the level of said filter tank falls below the level of said aquarium, this being the normal condition when the pump of the filter tank is operating.

It is an object of the present invention to provide a simple, commercially practical apparatus initiating a fluid flow within a siphon tube and of connecting a fish aquarium and its associated filter tank without removing the aquarium cover, or submerging one's hands in the aquarium or disturbing plants, scenery or fish therein.

It is another object of the above to provide an apparatus for starting a fluid flow within a siphon tube which will dispense with complicated accessories, valves, tubes and mechanisms heretofore required in the prior art in order to attain such results.

BRIEF DESCRIPTION OF THE DRAWINGS

FIG. 1 is a perspective view of a typical siphon tube with its associated perforated opening for insertion into an aquarium.

FIG. 2 is a perspective view of a sample prior art device which has been utilized in the home aquarium field.

FIG. 3 is a schematic view of a vacuum duct prior to its affixation to a siphon tube.

FIG. 4 is a perspective view of the siphon tube and vacuum duct with fluid trap, joined together and ready for use in the present application.

FIG. 5 is a perspective view of a siphon bulb, such as may be utilized in association with the present invention, showing a flexible extension suitable for reaching behind aquariums that are built in, or double decked close to walls.

DETAILED DESCRIPTION OF THE INVENTION

Figure 6:
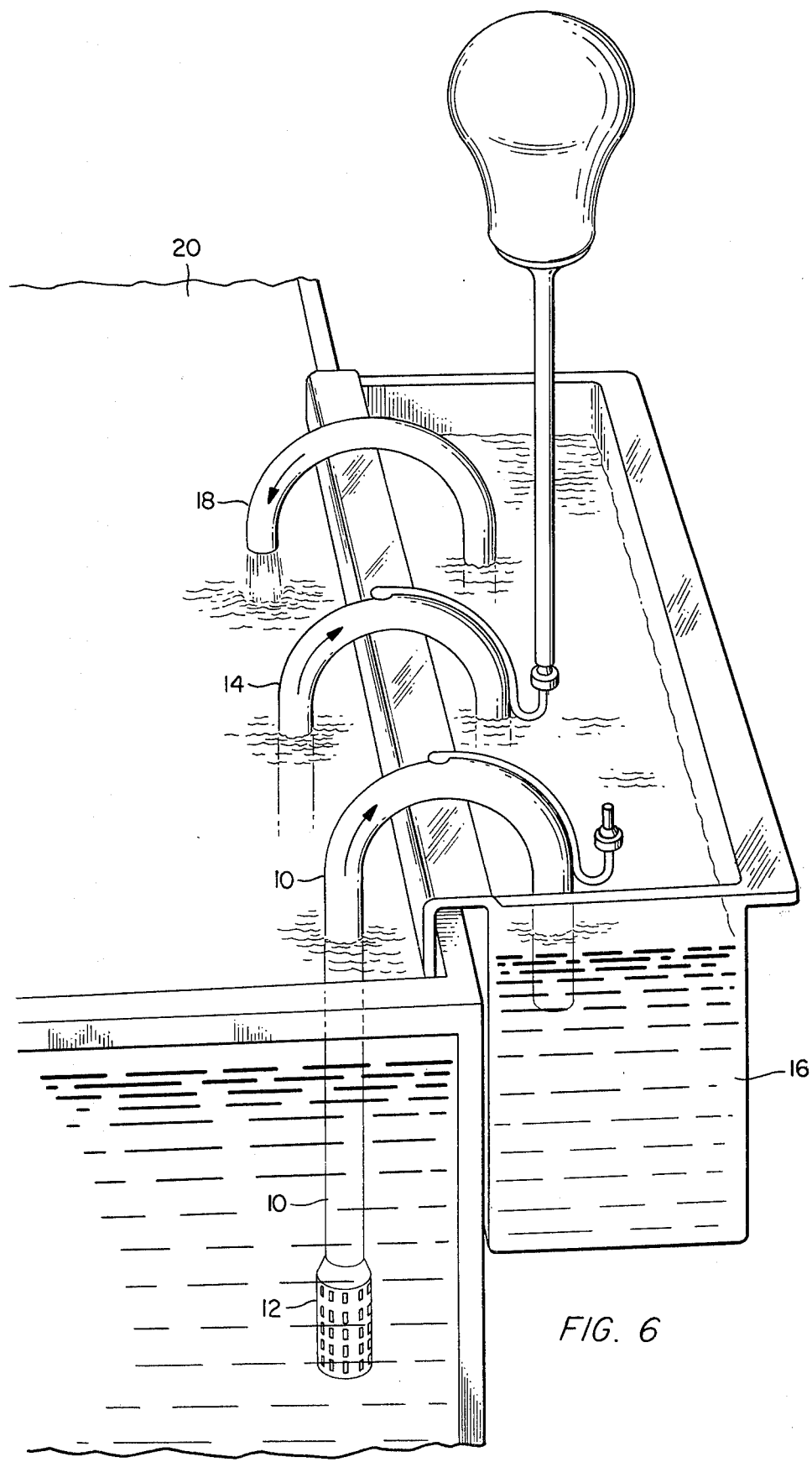
FIG. 6 is a general perspective view of the aquarium and associated filter tank with the present inventive method being applied thereto.

An understanding of the present invention must begin with an appreciation of the basic elements which, traditionally, have been utilized in the aquarium art for purposes of initiating a fluid flow from a primary aquarium tank to a secondary filter tank. More particularly, in FIG. 1 is shown a conventional siphon tube 10 having associated therewith a fish guard 12, the purpose of which is to prevent baby fish from becoming sucked into the tube 10.

The siphon tube 10 and its associated guard 12 constitute the basic mechanical elements utilized in facilitating a desired fluid flow. This may be more generally seen in FIG. 6 in which a functioning aquarium system is illustrated. In said Figure, it is noted that tubes 10 and 14 carry a water flow out of the aquarium proper and into the filter tank 16. It is further noted that a return duct 18 serves to transport water back from the filter tank 16 into the aquarium 20. The water flow within tube 18 is generated by a small water pump (not shown) disposed at the bottom or, alternatively, a small sump pump at the top of the filter tank 16. However, unlike the return duct 18, the water flow within tubes 10 and 14 is not generated by any primer mover such as a pump. Rather, the flow within tubes 10 and 14 is the result of a particular set of fluid dynamics which result from differentials in atmospheric pressure bearing against the respective surfaces of the water in tanks 16 and 20.

However, in order to initiate the fluid dynamic phenomenon, generally known as a siphon flow, within tubes 10 and 14, it is necessary to create a partial vacuum within said tubes.

In the prior art, after a siphon tube had been emptied, this was generally achieved through the use of a vacuum cap with an extention stick 22 (see FIG. 2) which was utilized in order to exclude all air from tube 10, and to replace this air with fluid, by submerging and rotating said tube 10 with cap and extention stick 22 thereon under water in the aquarium by lifting it out by the short end of the tube 10 with cap 22 intact and then carefully replace said tube 10 and cap into the filter position shown in FIG. 6 without allowing any air to force its way back under the cap on the short end of said tube 10. Cap 22 with extention stick was then removed after the short end was submerged into the full filter tank.

This procedure has, over the many years of its use, proved to be quite cumbersome and frustrating to aquarium users. Its basic deficiency derives from leaks which inevitably occur about the edge of the cap and which allow air into the siphon tube, thus allowing water to seep out from an end 24 of the siphon tube and losing the partial vacuum within tube 10. Accordingly, a need for much improvement upon the use of the siphon cap method has long existed.

The present invention may be practiced through effectuation of minor modifications within a conventional tube 10. More particularly, in FIG. 3 is illustrated a vacuum duct 26 with a fluid trap as well as an opening 28 which is made within the very top of tube 10. As one may note in FIG. 3, the vacuum duct 26 includes a first opening 30, a second fluid trap opening 32 and a washer or ball joint element 34.

After the opening 28 within the top of tube 10 is formed, the vacuum duct 26 is glued into position onto tube 10. This step is shown in FIG. 4.

Also utilized in the practice of the present inventive method is a siphon bulb 36 having an associated fluid tube 38. The end 40 of the tube 38 is of appropriate interior diameter so as to permit its slidable insertion over the top of element 32 of the vacuum tube 26. It is to be noted that the connection between elements 40 and 32 is non-permanent is that the siphon bulb assembly may be easily detached from the vacuum tube assembly. Alternatively, a flexible extension could be attached to 40 in order to reach 32. This arrangement could be used for hard to reach places such as aquariums that are built into walls or double decked close to walls.

In the practice of the present inventive method, the detachable siphon bulb 36 and its associated tube 38 is attached to the outlet 32 of the vacuum duct 26. This is done with the filter pump in an "off" position with the aquarium and the filter tank filled to the same level.

The siphon bulb is then squeezed in order to exhaust air from said bulb. This exhausted air is ultimately forced out into the aquarium tank 20. The bulb 36 is then released, thereby creating a pressure differential within the siphon tube 10 which will cause the air within said tube 10 to be drawn out through the vacuum duct into the bulb 36, with fluid entering the siphon tube, vacuum duct and its fluid trap. The fluid entering the up-turned trap blocks the air from going back into the vacuum duct and siphon tube, thus eliminating the use of any mechanical valves.

At this point, the siphon bulb assembly is removed, thereby leaving the siphon tube 10 in a condition of partial vacuum and, assuming that the level of tank 16 is of a lower level by the pump's action than the level of tank 20, thereby creating the necessary fluid dynamic conditions in order to initiate a fluid flow from the aquarium into the filter tank in tubes 10 and 14.

The siphon bulb is then put aside until the next occasion on which it is necessary, generally for purposes of cleaning, to interrupt the otherwise continuous fluid flow within tubes 10 and 14. In order to reinitiate the fluid flow, the above procedure can simply be repeated.

Hence, it may be appreciated, that the above constitutes an efficient method of starting a fluid flow within a siphon tube without the use of complicated accessories, valves and mechanisms such as have been heretofore required in the prior art in order to attain such results.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea of principles of this invention within the scope of the appended claims.

Having thus described my invention, what I claim as new, useful and non-obvious and accordingly secure by Letters Patent is:

1. An aquarium filter system comprising an aquarium, a filter tank associated therewith and at least one siphon tube extending therebetween, said siphon tube comprising a generally U-shaped structure possessing a first long arm extending into said aquarium, a second short arm extending into said filter tank, and a vertically extended U-bend connecting said long arm and said short arm, the improvement wherein a tube of reduced diameter is provided with one end thereof in operative connection with said siphon tube at the apex of said U-bend, said reduced diameter tube traveling partially down one side of said U-bend adjacent said short arm and terminating in an abruptly U-shaped, open ended, upwardly turned fluid trap; and a siphon bulb detachably attached to said fluid trap, wherein compression of said siphon bulb expels air completely from said reduced diameter tube and said siphon tube, and wherein release of compression of said siphon bulb results in the expansion of said bulb and causes water to enter and fill said siphon tube, said reduced diameter tube and said fluid trap, whereby detachment of said siphon bulb from said fluid trap prevents the reentry of air into said reduced diameter tube and said siphon tube.

2. The filter system of claim 1 further comprising an extension tube located in detachable attachment between said fluid trap and said siphon bulb.

* * * * *